(12) United States Patent
Chung

(10) Patent No.: US 11,828,854 B2
(45) Date of Patent: Nov. 28, 2023

(54) AUTOMATIC LIDAR PERFORMANCE MONITORING AND MAINTENANCE FOR AUTONOMOUS DRIVING

(71) Applicant: WeRide Corp., San Jose, CA (US)

(72) Inventor: Ji Yoon Chung, San Jose, CA (US)

(73) Assignee: WeRide Corp., San Jose, CA (US)

( * ) Notice: Subject to any disclaimer, the term of this patent is extended or adjusted under 35 U.S.C. 154(b) by 572 days.

(21) Appl. No.: 17/015,588

(22) Filed: Sep. 9, 2020

(65) Prior Publication Data
US 2022/0075072 A1    Mar. 10, 2022

(51) Int. Cl.
| | | |
|---|---|---|
| *G01S 17/93* | (2020.01) | |
| *G01S 17/931* | (2020.01) | |
| *G05D 1/02* | (2020.01) | |
| *G01S 7/4861* | (2020.01) | |
| *G01S 7/48* | (2006.01) | |
| *G01S 7/481* | (2006.01) | |

(52) U.S. Cl.
CPC .......... *G01S 17/931* (2020.01); *G01S 7/4802* (2013.01); *G01S 7/4861* (2013.01); *G05D 1/0287* (2013.01); *G01S 7/4813* (2013.01)

(58) Field of Classification Search
None
See application file for complete search history.

(56) References Cited

U.S. PATENT DOCUMENTS

| | | | | |
|---|---|---|---|---|
| 2014/0081507 A1* | 3/2014 | Urmson | ................ | B60W 40/06 701/28 |
| 2019/0302141 A1* | 10/2019 | Caldwell | ................. | G01S 17/58 |
| 2021/0389467 A1* | 12/2021 | Eshel | .................... | G01S 17/931 |

\* cited by examiner

*Primary Examiner* — Hovhannes Baghdasaryan
(74) *Attorney, Agent, or Firm* — Crowell & Moring LLP

(57) ABSTRACT

This disclosure describes example methods and apparatus for automatic identification of performance degradation in a Light Detection and Ranging (LIDAR) device and for providing appropriate precautions in the forms of operation interventions, warnings/alerts, and initiation of maintenance procedures. The performance degradation is derived from various performance indicators obtained by analyzing echo measurement samples detected by the LIDAR device.

19 Claims, 11 Drawing Sheets

AUTOMATIC LIDAR PERFORMANCE MONITORING AND MAINTENANCE FOR AUTONOMOUS DRIVING

TECHNICAL FIELD

This application relates generally to operation of Light Detection and Ranging (LIDAR), and particularly to LIDAR performance monitoring and maintenance for autonomous driving applications.

BACKGROUND

LIDAR devices may be used to detect objects at distances. For example, one or more LIDAR devices may be employed to detect road surfaces and other environment objects in autonomously driven vehicles. Accurate real-time detection of locations and distances of roads and other objects in autonomous driving is critical for maintaining safe operation of the vehicles. In practice, the detection accuracy of LIDAR may be compromised for various reasons. Automatic identification of causes underlying a performance degradation of a LIDAR device may facilitate timely correction of potential safety issues.

SUMMARY

The various embodiments of this disclosure below describe example methods and apparatus for automatic identification of performance degradation in a LIDAR device and for providing appropriate precautions in the forms of operation interventions, warnings/alerts, and initiation of maintenance procedures. The performance degradation is derived from various performance indicators obtained by analyzing echo measurement samples detected by the LIDAR device.

In some implementations, a method automatically performed by a LIDAR device is disclosed. The method includes transmitting laser pulses each at one of a set of directions for performing echo detections thereof; associating each of the set of directions with two or more detection outcome categories according to the echo detections; generating a plurality of system degradation indicators of the LIDAR device according to the echo detections and the two or more detection outcome categories; determining an environmental condition of the LIDAR device based on the echo detections; selecting a plurality of degradation thresholds according to the environmental condition; and generating a system instruction among a predetermined set of instructions for the LIDAR device based on the plurality of system degradation indicators and the plurality of degradation thresholds.

In the implementations above, the two or more detection outcome categories may include at least two of a first outcome category indicating a valid detection of echo; a second outcome category indicating an invalid detection of echo; or a third outcome category indicating that no echo is detected.

In any one of the implementations above, the method may further include associating a first subset of directions of the set of directions with the first outcome category when echoes for laser pulses associated with the first subset of directions are detected outside a minimum detection range of the LIDAR device; and determining a set of object distances each corresponding to one of the first subset of directions based on the echo detections.

In any one of the implementations above, the method may further include associating a second subset of directions of the set of directions with the second outcome category when echoes for laser pulses associated with the second subset of directions are detected inside of the minimum detection range of the LIDAR device.

In any one of the implementations above, the method may further include associating a third subset of directions of the set of directions with the third outcome category when echoes for laser pulses associated with the second subset of directions are undetected.

In any one of the implementations above, the plurality of system degradation indicators may include a first degradation indicator indicative of a number of objects within the minimum detection range; and a second degradation indicator indicative of a number of laser pulses with no detectable echoes.

In any one of the implementations above, the method may further include determining the first degradation indicator by identifying the number of objects within the minimum detection range of the LIDAR device based on analyzing the second subset of directions.

In any one of the implementations above, identifying the number of objects within the minimum detection range of the LIDAR device may include identifying continuous ranges of second subset of directions each being larger than a predetermined threshold size.

In any one of the implementations above, the method may further include determining the second degradation indicator by dividing the set of directions into two or more regions; separately counting numbers of the third subset of directions within the two or more regions; and determining the first degradation indicator based on a comparison between the numbers of the third subset of directions for the two or more regions.

In any one of the implementations above, the LIDAR device is operatively configured to assist autonomous driving in a vehicle, and wherein the two or more regions comprises a front region and a rear region of the vehicle.

In any one of the implementations above, the plurality of system degradation indicators further comprise a third degradation indicator indicative of an amount of detection noise within the first subset of directions.

In any one of the implementations above, the third degradation indicator comprises accumulated variation of distances of a predetermined number of neighboring directions within the first subset of directions as measured from the echo detections.

In any one of the implementations above, generating the system instruction among a predetermined set of instructions for the LIDAR device may include determining an overall degradation measure of the LIDAR device based on weighted combination of the first degradation indicator, the second degradation indicator, and the third degradation indicator; and generating the system instruction based on the overall degradation measure and the plurality of degradation thresholds.

In any one of the implementations above, determining the environmental condition may include determining a rainy condition.

In any one of the implementations above, determining the rainy condition may include identifying raindrops based on the echo detections associated with the first subset of directions.

In any one of the implementations above, identifying raindrops may include identifying directions among the first subset of directions within a predetermined range of directions and corresponding object distances within a predetermined object distance range that are spatially isolated more than a predetermined isolation threshold in direction and in object distance.

In any one of the implementations above, the LIDAR device is operatively configured to assist autonomous driving in a vehicle, and the predetermined set of instructions may include alerts of different maintenance levels.

In any one of the implementations above, the predetermined set of instructions may include at least one of slow down the vehicle; stop the vehicle; pull over the vehicle; go to service station immediately; or go to service station with minimal delay.

In any one of the implementations above, the LIDAR device is operatively configured to assist autonomous driving in a vehicle, and the system instruction comprises a speed limit.

In some other implementations, a system for Light Detection And Ranging (LIDAR). The system may include a laser source; a detector; and a processing circuitry in communication with the laser source and the detector. The laser source is configured to transmit laser pulses each at one of a set of directions for performing echo detections thereof. The processing circuitry is configured to associate each of the set of directions with two or more detection outcome categories according to the echo detections; generate a plurality of system degradation indicators according to the echo detections and the two or more detection outcome categories; determine an environmental condition of the system based on the echo detections; select a plurality of degradation thresholds according to the environmental condition; and generate a system instruction among a predetermined set of instructions based on the plurality of system degradation indicators and the plurality of degradation thresholds.

DETAILED DESCRIPTION

Figure 1:
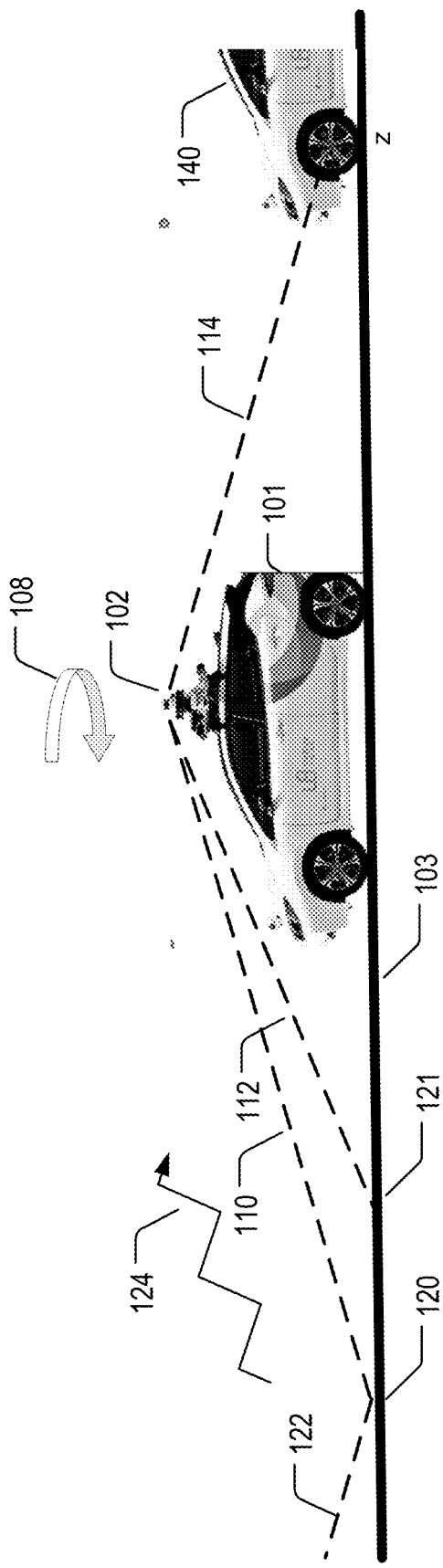
FIG. 1 shows an example LIDAR device deployed with a vehicle for detecting road conditions and other environmental objects.

The technologies and examples of implementations and/or embodiments in this disclosure can be used to detect performance degradation of Light Detection and Ranging (LIDAR) devices. The term "exemplary" is used to mean "an example of" and unless otherwise stated, does not imply an ideal or preferred example, implementation, or embodiment. The implementations may be embodied in a variety of different forms and, therefore, the scope of this disclosure or claimed subject matter is intended to be construed as not being limited to any of the embodiments set forth below. The various implementations may be embodied as methods, devices, components, or systems. Accordingly, embodiments of this disclosure may, for example, take the form of hardware, software, firmware or any combination thereof.

Operation Principles of LIDAR Devices

By way of introduction, a LIDAR device may be used for detecting an object at a distance by transmitting a probing laser pulse towards the object and monitoring a scattered echo of the probing laser by the object. The distance of the object from the LIDAR device may be measured by determining a round-trip time-of-flight (TOF) of the probing laser pulse and echo laser pulse. LIDAR devices may be used in many object detection and ranging applications. Specifically, one or more LIDAR devices may be installed in a vehicle for real-time detection of roads and other environmental objects on or near the roads. Such real-time information is particularly critical for safe operations of an autonomously driven vehicle.

In practice, detection accuracy of LIDAR may be compromised in various manners. For example, optical pathways within the LIDAR device for the outbound laser pulses and/or the returning echo pulses may become sputtered and covered with dirt over time, resulting in misdetections. For another example, the road surface may become too reflective (e.g., when the road surface is wet or icy) of the probing laser pulse to produce echoes at detectable levels. For yet another example, key components of the LIDAR device such as the probing laser sources and/or the echo detectors may malfunction, leading to abnormally noisy echo samples. Noisy echoes may be further caused by weather conditions. All these situations lead to erroneous detections that may mischaracterize the road and other environmental conditions of the vehicle and thereby comprise the safety operation of the vehicle. Some of these reasons, e.g., conditions due to weather, may be temporary and may be coped with by adjusting various parameters used in the detection logic of the LIDAR device and in the vehicle control system, or by pulling the vehicle over and wait for these temporary conditions to revert. Some other reasons, however, may require immediate maintenance or services to the vehicle or replacement of the LIDAR device.

This disclosure describes example methods and apparatus for automatic identification of performance degradation caused by the various conditions above and for providing appropriate precautions in the forms of operation interventions, warnings/alerts, and initiation of maintenance procedures. The performance degradation is derived from various performance indicators obtained by analyzing the echo measurement samples. While the examples below focus on application of LIDAR devices in autonomously driven vehicles, the underlying principles are not so limited and are applicable to other use cases of the LIDAR technology.

FIG. 1 illustrates operation principles of one or more LIDAR devices 102 installed in a vehicle 101 on road 103. The LIDAR devices 102 for example may be installed on top of the vehicle 101 to provide a panoramic view of the road conditions and environment, as shown in FIG. 1. Alternatively, the LIDAR devices 102 may be installed inside the vehicle 101 with unobstructed view of the surroundings of the vehicle. In some other implementations, the LIDAR devices 102 may be distributed around the vehicle and collectively provide the panoramic view of the road conditions and environment.

The LIDAR device 102 may be configured to include one or more laser sources for emitting probing laser pulses in various vertical directions (or vertical angles). In some implementations, a linear array of laser sources may be configured to cover the vertical angle range of detection, such as vertical angles corresponding to directions 110 and 112. In some other implementations, each laser source may be scanned and time shared to cover a range of vertical angles. These laser sources may be further spun around the vertical axis, as shown by a rotation arrow 108, or scanned horizontally such that the laser sources are time shared between azimuthal detection angles around the vehicle, such as azimuthal angles 110 and 114. In such a manner, the laser sources in the LIDAR device 102 collectively cover all of a predetermined set of detection directions around the vehicle.

Each of the laser sources may be configured to emit a successive series of laser pulses as laser beams while being scanned or rotated. Example laser beams are shown along directions 110, 112, and 114 in FIG. 1. A laser pulse may travel unimpededly until it reaches an object, such as the road surface 103 at locations 120 and 121 as shown in FIG. 1, or other objects, such as another vehicle on the road 103, as shown by 140. Upon hitting the object, the laser pulse may be scattered (as shown by 124), reflected (as shown by 122), refracted, and/or diffracted. Part of the laser pulse, after being scattered, refracted, diffracted, or reflected, may travel along the reverse direction of the laser pulse and may be detected by one or more optical detectors in the LIDAR device 102. Such a returning laser pulse may be referred to as an echo pulse. These optical detectors can determine a timing of the detected echo and derive a round-trip TOF of the laser pulse from leaving the LIDAR device as a probing pulse to returning to the LIDAR device as an echo pulse. Such round-trip TOF may be used by the LIDAR device to determine a distance from the object to the LIDAR device. With a sequence of laser pulses emitted towards all vertical and azimuthal directions and their echoes detected, an object map may be generated by the LIDAR device in a form of, for example, a radar chart.

Figure 2:
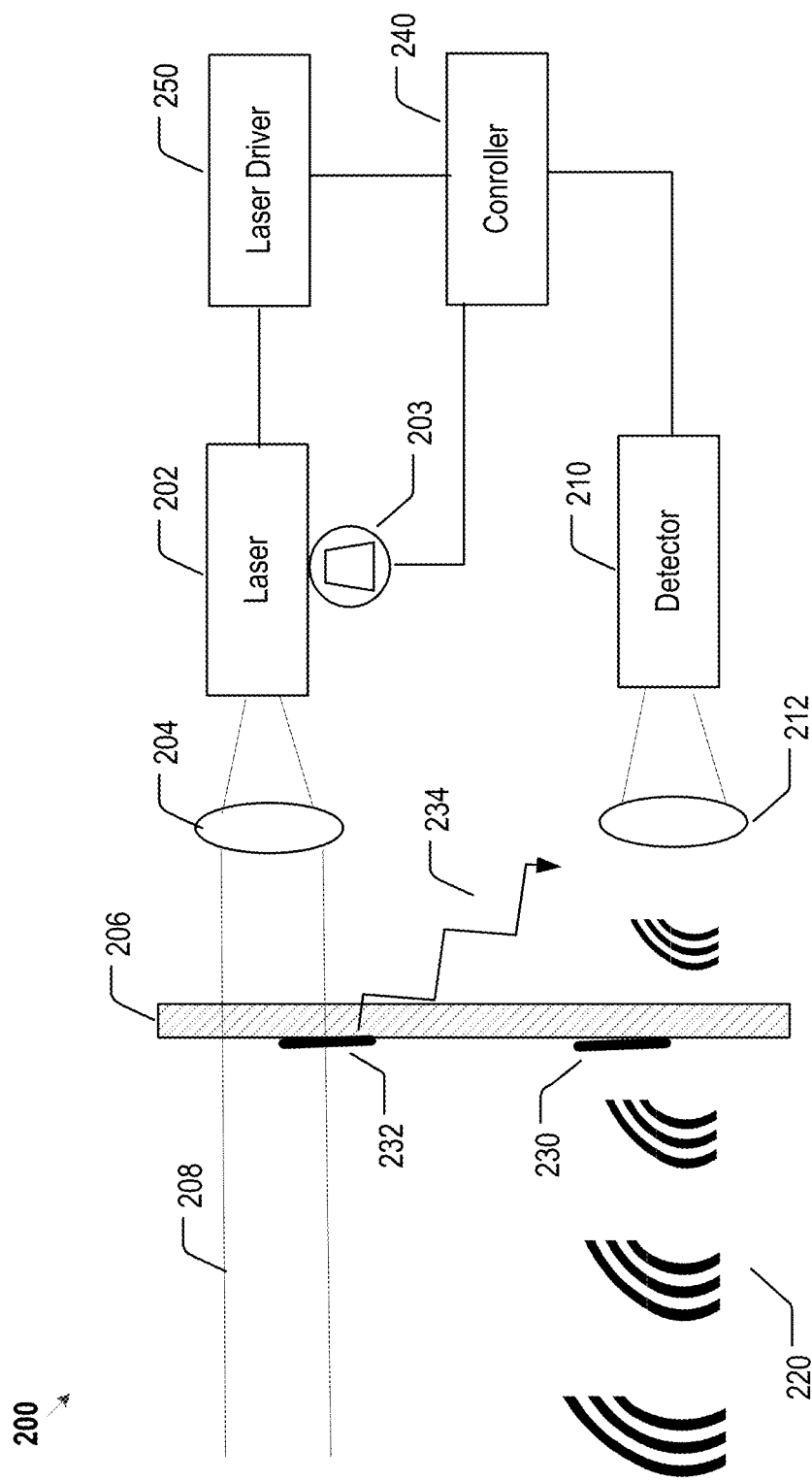
FIG. 2 shows various components of an example LIDAR device.

FIG. 2 shows example components of a LIDAR device 200. The LIDAR device 200 may include one or more laser sources 202 (one laser source is shown as an example) and one or more optical detector 210 (one detector is shown as an example). The LIDAR device may further include laser driver(s) 250, laser beam forming optics 204, echo collection optics 212, spinning or scanning device 203 for adjusting the laser emission angle from the LIDAR device, and a controller 240 including computer hardware and software for controlling the laser driver 250, the spinning/scanning device 203, and the detector 210. The LIDAR device 200 may further include optical windows 206 from which the probing laser pulse exit the LIDAR device and the through which the echo pulses returns to the detector 210. The window 206 may further function as part of an enclosure to house the LIDAR optical components.

The laser source 202 may be based on any type of laser technologies for generating laser pulses at a suitable wavelength within one of the low optical loss spectral windows of air. The probing laser pulses emitted from the laser source 202, may be processed by the optics 204 before exiting the LIDAR device. For example, the laser optics 204 may include an optical lens for generating a collimated laser beam 208, which pass through the optical window 206 of the LIDAR device at a vertical angle and an azimuthal angle as described above. The optical window 206, for example, may include a reinforced glass or plastic window capable of withstanding impact from stray rocks off the road. The collimated laser beam 208 may be scattered by an object in its path and the scattered echo laser pulse may be partially directed to the LIDAR device, and passes through the exit window 206. The echo pulse is focused by the collection optics 212, and detected by the detector 210.

An optical filter may be included in the LIDAR device 200, shown as integrated with the optical window 206 as a single element. The optical filter, for example, may be designed as a band pass filter. The optical filter may be characterized by a narrow pass band centered at the wavelength of the probing laser pulse. The optical filter may be used to reject background light from outside of the LIDAR device and at wavelengths other than that of the probing laser pulse. As such, optical background and noise level in the echo signal detected by the optical detector 210 may be minimized. In some implementations, the optical band-pass filter may be achieved by coating the optical window 206 with a stack of dielectric or metallic thin films. In some other implementations, a standalone optical filter element may be used.

The optical window 206 of the LIDAR device 200 may become sputtered with dirt, as shown by 230 and 232 in FIG. 2. Such dirt may come from, for example, splashes from the road, accumulated dusts, and/or dead bugs. Such dirt may cover portions of the optical window 206 in front of either the probing laser exit region or the detection optics, or both. The dirt, if excessively accumulated and not timely cleaned, may adversely affect the performance of the LIDAR device. As such, automatic detection of a dirt level may become critical for a safe operation of the vehicle.

Figure 3:
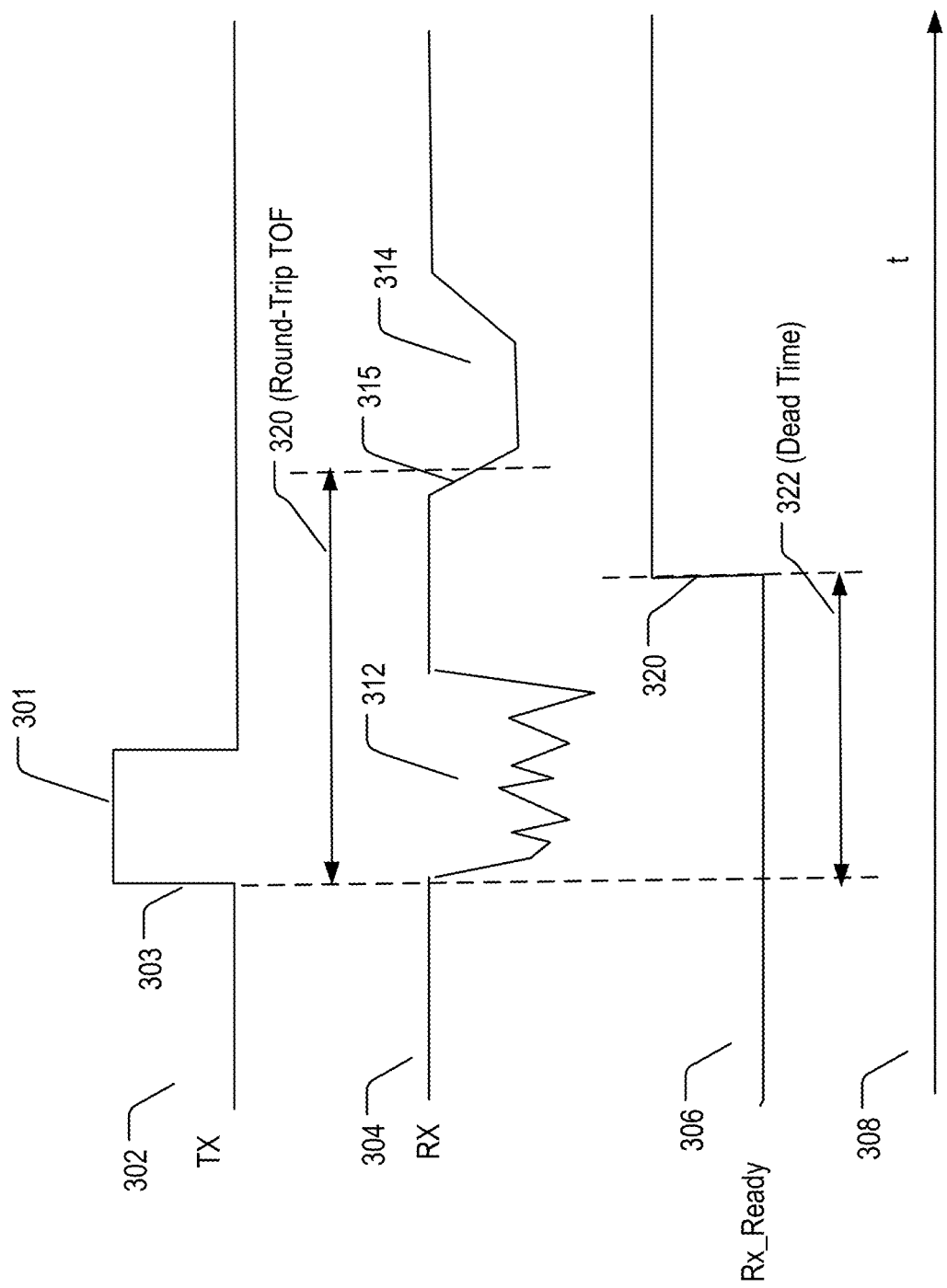
FIG. 3 illustrates timing relationships between a probing laser pulse, an echo signal, and a discriminating gating signal for a LIDAR detection event.

The timing of the emission of the probing laser pulse by the laser source 202 and the detection of the echo pulse by the optical detector 210, as shown in FIG. 3, provide the basis for determining a distance of a detected object. FIG. 3 shows an example time profile 302 of a laser pulse 301 generated by the laser source 202 of FIG. 2 as a function of time t as shown by the time axis 308. The time profile 302 of the probing laser pulse may be characterized by a rising edge 303 (indicating the start of the laser pulse) and a pulse width. The probing laser pulse time profile may be denoted as a "Tx" signal.

An example detected optical signal by the detector 210 is shown in 304 of FIG. 3, as denoted as an "Rx" signal. The detected Rx signal at the detector 210 includes noises (for example, electric noise-like ground level variations that occur when a control logic enables FET gate to provide TX power, and internal optical leakage spikes 312) and the echo pulse 314 from the object. In order to prevent the internal noise signal from affecting distance measurement, a gating signal 306 may be used to discriminate the detected optical signal 304. In particular, the gating signal may include a gating edge 320. Optical signal in 304 that is before the gating edge 320 may be disregarded whereas the optical signal in 304 which is after the gating edge 320 is used for distance analysis and measurement. In other words, only the Rx signal after the gating edge 320 of the gating signal 306 is used for distance determination. As such, the gating signal 306 may be alternatively referred to as "Rx-Ready" signal.

The echo pulse, as shown by 314 in FIG. 3, may include a leading echo edge 315. The time difference between the leading edge of the probing laser pulse as shown by 303 and the leading edge 315 of the echo signal represents the round-trip TOF of the probing laser pulse and scattered echo pulse, as represented by 320 of FIG. 3. Such a round-trip TOF, may be converted to a measured distance by multiplying the round-trip TOF 320 with the speed of light and divided by 2. As shown in FIG. 3, the leading edge of the echo signal 315 may be smeared to some extent as a result of, for example, tilted laser spot on a detected object surface that simultaneously sample a range of distances. Depending on the illumination condition (e.g., day time or night time), the threshold of Rx is adjusted to determine leading edge of 315 of the echo pulse. In high-end devices, Rx signal can be digitized by ADC and post-processed to better determine the leading edge of the echo pulse. In some implementations, the mid-time point of the smeared leading edge 315 of the echo pulse may be used for distance determination.

The time difference between the leading edge 303 of the probing laser pulse 301 and the gating edge 320, as indicated by 322 in FIG. 3, represents a dead time $t_d$ for distance measurement. The length of the dead time $t_d$ (corresponding to a detection dead zone) depends on the path length (which may include multi-reflection and scattering paths) of the optical leakage in the LIDAR device (e.g., the time extent of the optical leakage signal 312) and/or the laser emission duration (e.g., some laser emits in 5 nanosecond duration corresponding to a dead zone of 5×15 cm=75 cm). The dead time $t_d$ corresponds to a minimum detectable distance $d_{min}$ of the LIDAR device. Distance of objects within $d_{min}$ may not be accurately measured. The minimum measurable distance $d_{min}$, for example, may be around 0.1 to 3 meters, corresponding to a dead time $t_d$ of 0.7-20 ns.

Categorization of Detection Outcome

Once the LIDAR device above initiates one of many detection events by transmitting a probing laser pulse, the LIDAR device may be configured to categorize its echo detection outcome of the probing laser pulse into several distinct types.

For example, the LIDAR device may receive a valid echo pulse with identifiable leading edge, indicating that an object has been detected at the direction of the probing laser pulse outside of the minimum distance $d_{min}$ from the LIDAR device. The LIDAR device may characterize such a detection event as a valid event. The object distance can then be derived from the measured TOA for a valid event. A collection of valid echo detections at various probing laser pulse angles at various times form 3D LIDAR detection point clouds as a function of time that map out distances of detected objects in corresponding detection angles (e.g., vertical and azimuthal detection angles).

For another example, the LIDAR device may receive no detectable echo within a predefined time limit (which corresponds to a maximum detection distance). The LIDAR device may characterize such an event as a no-return detection event. A no-return detection event may represent a correct indication that no object is present in the direction of the probing laser pulse within the maximum detection distance. Alternatively, a non-return detection event may result from dirty detection optics/windows, or from the probing laser pulse being impinged on an object with a surface that reflects most of the laser pulse to a direction away from the LIDAR detector. No-return events due to either of these reasons may represent an erroneous indication that no object exists in the direction of the probing laser pulse. Reflecting surface that could cause a no-return event may include wet roads during or after rains, or icy roads. Substantial reflection of a probing laser pulse by road surface is illustrated by 122 in FIG. 1. Dirty detection optics that could cause no-return probing event is illustrated as 230 of FIG. 2.

Figure 4:
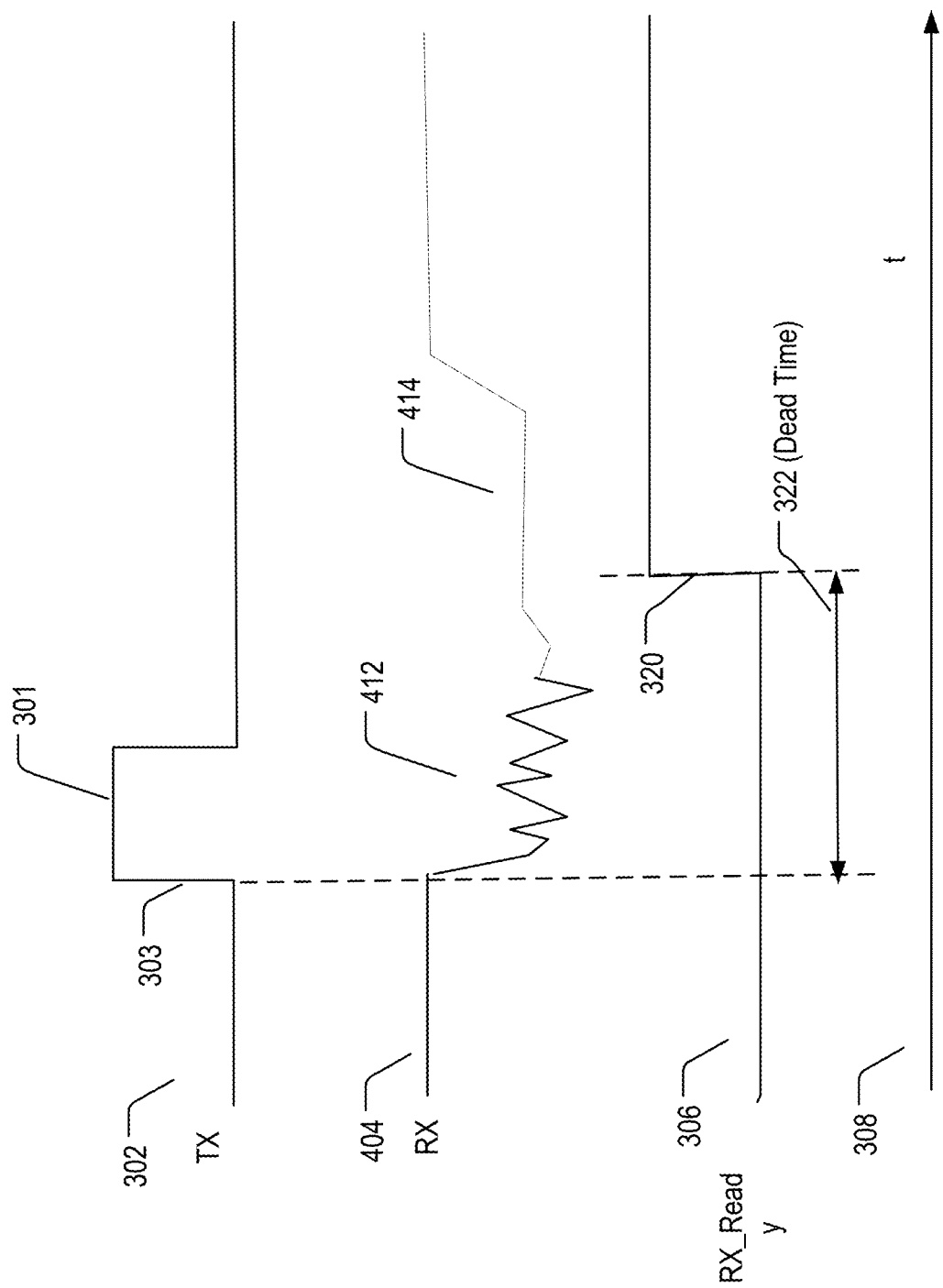
FIG. 4 illustrates principles for detecting existence of objects within a minimum detection distance of a LIDAR device.

For yet another example, an echo from the detection event may be received but without a leading edge. The LIDAR device may categorize such a detection event as an invalid detection event, as a distance shorter than the minimum detectable distance $d_{min}$ may not be derived due to a lack of leading edge in the echo signal and thus no accurately measurable TOF. This is illustrated in FIG. 4. As shown in FIG. 4, the detected echo Rx signal 404 before being discriminated by the gating signal 306, may contain the optical signal 412 due to optical leakage in the LIDAR device and the echo 414 of the probing laser pulse. However, because the object generating the echo 414 is too close to the LIDAR device (e.g., with a distance smaller than the minimum detectable distance $d_{min}$), no leading edge of the echo signal 404 may be measured. In other words, the leading edge of the echo signal may be buried in the optical leakage signal 412. Without the leading edge in the echo signal 404, the TOA cannot be accurately determined. As such, a distance of such an object cannot be derived.

Detection events of this type may be considered as invalid events, but may be differentiated from no-return events. As described in more detail below, invalid events may be analyzed to determine a detection of dead bugs or other type of dirt in the exiting path of the probing laser pulse from the LIDAR device. These invalid events may be recorded separately from the no-return events even though both of these types of events correspond to no distance measurements.

The valid detection event, the no-return event, and the invalid events may be separately recorded by the LIDAR device and used to derive operation degradations of the LIDAR device, as described in more detail below. Further, the type information for each detection event may be encoded in the distance output of the LIDAR device for the detection event, as described in more detail below.

Determination of Obstruction to Probing Laser Pulses and an Obstruction Indicator The operation performance of the LIDAR device may degrade as objects such as dirt or dead bugs accumulate in the optical paths of the probing laser pulses within or near the LIDAR device (e.g., on the optical window 206 of FIG. 2). Such objects would block the probing laser pulses at some detection directions (e.g., at some vertical and/or azimuthal angles). These objects are typically inside or close to the LIDAR device. As such, they may produce echo signal when being struck by a probing laser pulse. Such an echo signal, however, may not give rise to an identifiable leading edge as the leading edge is most likely obscured by the optical leakage signal as shown in 404 of FIG. 4.

As such, the invalid detection events described above, although incapable of providing any distance measurement, may be used as an indication of a presence of objects obstructing the probing laser pulses. Further in some implementations, invalid detection events may be identified in blocks of consecutive detection directions (e.g., consecutive vertical and/or azimuthal angles) covered by a same laser source and having a block size larger than a predetermined block size threshold. In other words, blocks of invalid events with a size smaller than the block size threshold may be viewed either as insufficient to cause significant errors in the point cloud described above or as erroneous measurements.

Figure 5B:
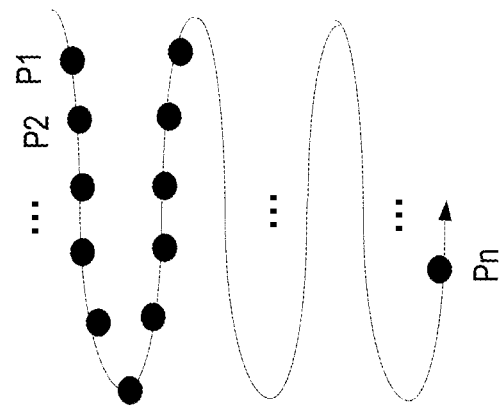
FIGS. 5a-5b illustrate spatial or angular detection ranges of a spinning laser source and a spatially scanning laser source of a LIDAR device, respectively.
Figure 5A:
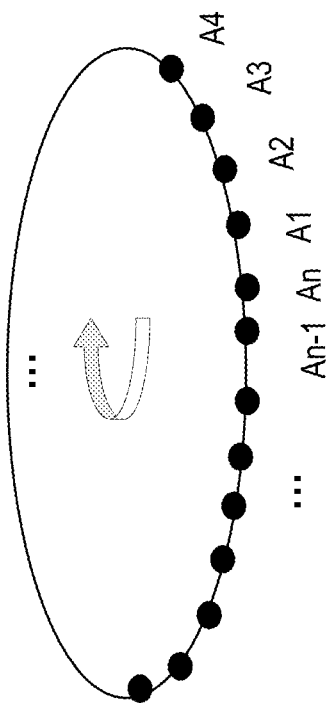

Each block of invalid detection events may be associated with a range of detection directions. For example, as shown in FIG. 5a, a block of invalid detection events, from a azimuthally rotating laser source, may be associated with a range of azimuthal angles having a beginning azimuthal angle and an end azimuthal angle among the azimuthal angles $A_1, A_2, A_3, \ldots, A_n$. For another example, as shown in FIG. 5b, block of invalid detection events, from a 2D scanning laser source, may be associated with a range of scanning coordinates having a beginning scanning coordinate and an end scanning coordinate among the scanning coordinates $P_1, P_2, P_3, \ldots, P_n$. Each $P_i$, for example, may correspond to <x, y>, or <x, y, z> coordinates of a scanning element for the laser source (such as a MEMS mirror element).

As there may be multiple laser sources included in the LIDAR device each covering a subspace of detection directions (e.g., a subset of vertical and/or azimuthal angles), each of the detected block of invalid detection events may be further associated with a laser source identifier (ID).

To identify blocks of invalid detection events associated with a particular laser source, all invalid detection events for the laser source may be collected by the LIDAR device. Blocks of invalid detection events may be identified by finding consecutive detection events with sufficient number of detection events (larger than a block size threshold) and recording these blocks (e.g., recording the beginning detection direction, end detection direction, and corresponding laser source ID). As the spinning or scanning of the laser sources repeats in time and the objects obstructing the probing laser pulse may be at fixed positions relative to the LIDAR device (in other words, these objects do not spin or scan with the laser sources), the corresponding blocks of invalid detection events would repeat. As such, a log may be generated to record known blocks of invalid detection events. New blocks may be added to the log as they are identified from the updated invalid detection events. For example, the recorded blocks of invalid detection events may correspond to a plurality of dead bugs stuck on the optical window of the LIDAR device. Each block, representing a dead bug, may be associated with a laser ID and a range of detection directions recorded in the log. As a new dead bug appears at a different location on the optical window, a new block may be identified from the updated invalid detection events and may be associated with a laser ID and a range of detection directions. A block may be identified as a new block if it does not overlap in range of detection directions with existing blocks. The new block may be added to the log if the log is not full (e.g., the number of recorded blocks does not exceed a maximum capacity of the log). Otherwise, an older and less useful block may be replaced by the new block.

Once these blocks of invalid detection events are identified and logged, a normalized or scaled invalid detection level indicator (alternatively referred to as an obstruction indicator) of the LIDAR device (for indication, for example, of the amount of close-by objects such as dead bugs that obstruct the probing laser pulses) may be derived. For example, these blocks of invalid detection events associated with each lasers that are consistently detected and are large enough to significantly affect the performance of the LIDAR device (e.g., of size of a dead bug) may be quantitatively accumulated into a "dead bug" possibility value. Such a possibility value may be normalized to lie between a minimum value and a maximum values (e.g., between 0 and 10) as a scaled obstruction indicator (or "dead bug" indicator).

"Dirtiness" Indicator

Dirt accumulated over the outer surface (e.g., the optical window 206 of FIG. 2) of the LIDAR device may further attenuate echo pulses to the optical detector 210 of FIG. 2, leading to no-return detection events. As such, the number of no-return detection events may be used to characterize a "dirtiness" of the LIDAR device. In some situations, environmental conditions, such as wet or icy road surfaces, may cause excessive reflection of a probing laser pulse and may also lead to excessive amount of no-return detection events. As such, merely counting the no-return detection events may not provide an accurate measure of the dirtiness of the LIDAR device. In some implementations, the effect of the environment conditions on the count of no-return detection events may be accounted for by detecting and parametrize these environmental conditions in the analysis of the on-return detection events.

In some other implementations, dirtiness of the LIDAR device may be determined by dividing the detection directions into various zones and analyzing relative or differential no-return detection events counts among the various zones. For example, portion of the optical window of the LIDAR device facing the front of the vehicle may become dirty more than the portion facing the rear of the vehicle, due to road splashes that occur from the front of the vehicle significantly more than from the rear of the vehicle. As such, by dividing the detection directions into various zones (e.g., a front zone and a rear zone) and comparing the number of non-return detection events in each zone (for example, by ratio, or by differential counts), a level of dirtiness caused by road slashes may be estimated.

Figure 6:
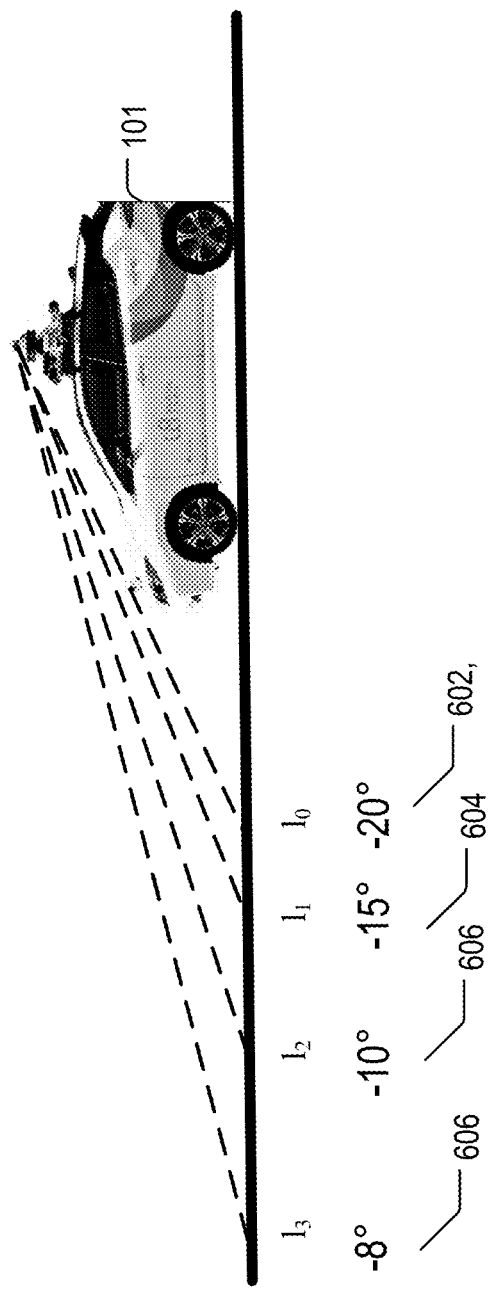
FIG. 6 shows various vertical angles detected by a LIDAR device.

A normalized dirtiness indicator may be estimated in various manners with an example described below. As shown in FIG. 6, multiple laser sources may be used to detect objects at various vertical angles from the horizontal plane. Each laser may be configured to be oriented at a particular vertical angle and spun around the vertical axis to cover all azimuthal angles. Example vertical angles are shown in FIG. 6 as 602, 604, 606, and 608, for −20°, −15°, −10°, and −8°, respectively. The ratios between no-return and total detection event counts for these vertical angles are represented by $I_0, I_1, I_2, I_3, \ldots$, where angle of $I_k$<angle of $I_{k+1}$ (for example, in FIG. 6, −20° is smaller than)−15°. For example, if the laser associated with angle k emits 100 times and LIDAR device obtains 70 valid returns, $I_k$ would be 0.3. Typically, the largest vertical angle of laser $(I_m)$ may be configured to detect about 30 to 40 m from the LIDAR device. The values $I_0, I_1, I_2, I_3, \ldots$ would be 0 for negative vertical angles in the ideal situation (all detections are valid). Practically, however $I_k$ may be around 50% or higher as the LIDAR device may be configured with sensitivity to detect return about 50% of the time for an object that is around a large distance away (e.g., 200 m) and have a predetermined reflectivity (e.g., 10%).

In some example implementations, a lowest no-return-to-total-event ratio at which all lasers (each at different vertical angles in FIG. 6, and each scanned with detection events in azimuthal angles) produce fewer valid returns may be used as the dirtiness indicator. In particular, if all lasers are performing at a no-return-to-total-event ratio at or higher than a particular value, that particular value is considered as the dirtiness indicator. The higher the indicator value, the dirtier the LIDAR. In some implementations, the dirtiness indicator value or level may be normalized between 0 and 0.6. In some other implementations, multiple dirtiness level indicators may be calculated separately for different azimuthal zones. For example, separate dirtiness level indicators may be calculated for a front and rear azimuthal zones. As described above, the ratio or difference between the front and real dirtiness level indicators may provide a further indication of dirtiness of the LIDAR device.

Detection Noise

In some situations, the noise in the measured object distances may become excessive due to various reasons. For example, a laser source of the LIDAR device may have degraded over time and may emit probing laser pulses of an intensity lower than normal, leading to low and noisy echo signals. Likewise, an optical detector of the LIDAR may have degraded over time and may generate echo signal that is noisier than normal. These noises may be detected based on the example implementations below and may be used to indicate whether the LIDAR device has degraded in performance. For example, such noises may be determined from measured object distances among a plurality of consecutive detection directions (or detection events), as described below in relation to FIGS. 7 and 8a-8c.

Figure 7:
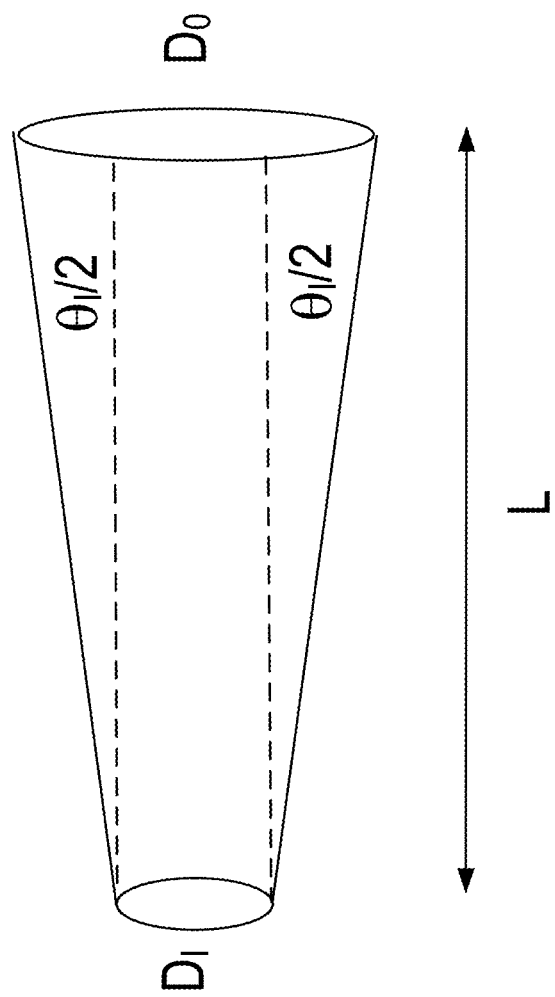
FIG. 7 illustrates divergence of a beam of a typical probing laser pulse.

FIG. 7 shows a spatial divergence of a typical probing laser beam. Specifically, due to optical diffracting effect, a laser beam cannot be completely collimated and the laser beam always diverges away from its waist. The divergence of a laser beam with, for example, a Gaussian divergence profile, may be approximated by $$D_0 = DI + 2\left[L \cdot \tan\left(\frac{\theta_I}{2}\right)\right],$$

where $D_I$ is the initial beam size, $D_0$ is the beam size after distance L, and $\theta_I$ represents the diverging angle of the laser beam, as shown in FIG. 7. A laser beam having a smaller $D_I$ is usually harder to collimate (corresponding to larger divergence angle $\theta_I$). In order to maintain a small enough divergence of $\theta_I$ of, for example, 3 mini radiant (for $D_0=D_I+2*L*0.0015$ with the beam size increase by 30 cm after 100 meters of propagation), the initial beam size $D_I$ need to be sufficiently large. In some example implementations, $D_I$ of the laser beam may be around 2 to 5 cm.

As such, a probing laser pulse impinged upon a particular object surface may occupy a significant area with a diameter of around 5 cm or larger rather than a small point. Because several consecutive laser pulses from a laser source for a series detection events may be emitted with small directional difference, these consecutive laser pulses may overlap significantly as they impinge on an object. As such, it is expected that these consecutive probing pulses provide very similar distance measurements. Any large variation in measured distances between neighboring probing pulses may be indicative of a presence of significant noise.

Figure 8C:
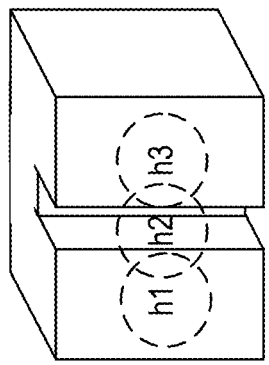
FIGS. 8a-8c illustrate directional/spatial overlapping of the probing laser beam in consecutive detection events for different object surface topologies.
Figure 8B:
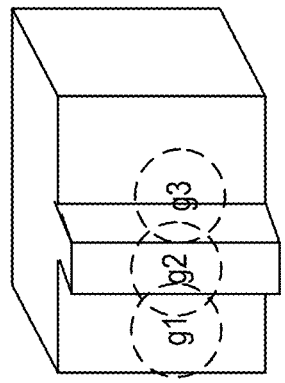
Figure 8A:
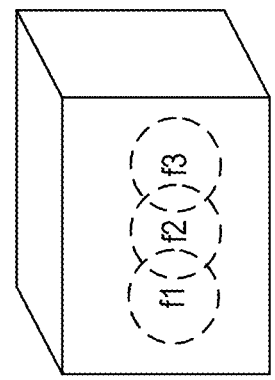

This principle is further shown in FIGS. 8a-8c. Specifically, FIGS. 8a-8b show three different types of topology variations of a detected object on a length scale comparable to the beam size of the probing laser pulses. FIG. 8a shows a flat topology, whereas FIGS. 8b and 8c show an extruding topology and an intruding topology, respectively. Laser spots of three consecutive detection events are shown as ($f_1$, $f_2$, $f_3$), ($g_1$, $g_2$, $g_3$), and ($h_1$, $h_2$, and $h_3$) for the three topologies. As illustrated in FIGS. 8a-8c, the three consecutive laser pulses for each topology overlap significantly. As such, each laser pulse measures average object distance sampled over an area on the object of the size of the laser beam. Due to this average sampling, the distances measured by the three consecutive laser pulses should not vary greatly for any of the three topologies in FIGS. 8a-8c. Any large variation of the measured distances between this consecutive detection events would indicate significant noise.

In some implementations, the distance noise with respect to $f_2$ of FIG. 8a, for example, may be calculated as $D_{f2}-(D_{f1}+D_{f3})/2$. In other words, the noise of detection event may be calculated as a deviation of the measured distance of the detection event from an average of the distances measured in its two neighboring detection events. Likewise, the distance noise for $g_2$ of FIG. 8b and $h_2$ of FIG. 8b, for example, may also be calculated as $D_{g2}-(D_{g1}+D_{g3})/2$ and $D_{h2}-(D_{h1}+D_{h3})/2$, respectively. It is expected that these variations are small in absolute sense or relative to the measured distances. Large noise may signify operation degradation of the LIDAR device.

The noise for each detection event may be obtained in the manner above for each laser source for a series of detection events. Noise for each of the individual detection event may be used as an indicator for the operation condition of the LIDAR device. Alternatively or additionally, an accumulated noise level may also be calculated and used as an alternative or additional indicator of the operation and performance of the LIDAR device.

For example, two different noise parameters may be accumulated, including the direct noise as described above, and the square of the noise. In some implementations, a noise is considered as meaningful and thus accumulated for a particular detection event only if the measured distances between two neighboring detection events are not so discrepant (in other words, distance variation of neighboring detection events where the probing laser pulse impinges on a sharp edge of an object is ignored). Further, an abnormally large noise detection may also be ignored in the noise accumulation as an impulse error.

A mean noise may be determined from the accumulated noise. Likewise, a noise variance may be determined from the accumulated noise squared as a noise variance (a difference between a mean of the accumulated noise squared and a square of the mean noise). Further, a standard deviation for the noise may be determined as a square root of the noise variance. Any of these noise indicators individually or collectively may be used as a noise level indicative of a performance degradation of the LIDAR device.

Rain Level Detection

Rain leads to wet road surface. Wet road surfaces tend to have higher optical reflectivity than dry road surfaces. As such, under a rainy condition, probing laser pulses from the LIDAR device are more likely to be reflected away from the LIDAR device by a road surface than being scattered back to the LIDAR device, leading to a higher no-return event count. In other words, the ratio of non-return events over a total detection events would be lower in a rainy condition than in a dry condition. If the raining condition is not detected and not considered in evaluating the operation performance of the LIDAR device, several inaccuracies in the evaluation may be had. As one example, a higher no-return event count in a raining condition may be mistakenly evaluated as being caused by dirty LIDAR optics when the actual reason behind the increase of no-return events is the higher reflectivity of the wet road.

Therefore, it may be desirable for the LIDAR device to automatically detect a rainy condition in order to perform more accurate evaluation of the performance of the LIDAR device. The detection of a raining condition may be performed by the LIDAR device by detecting echoes of probing laser pulses from raindrops. The detected raindrops may be further counted to generate a rain level indicator representing how heavy the rain is.

Figure 9:
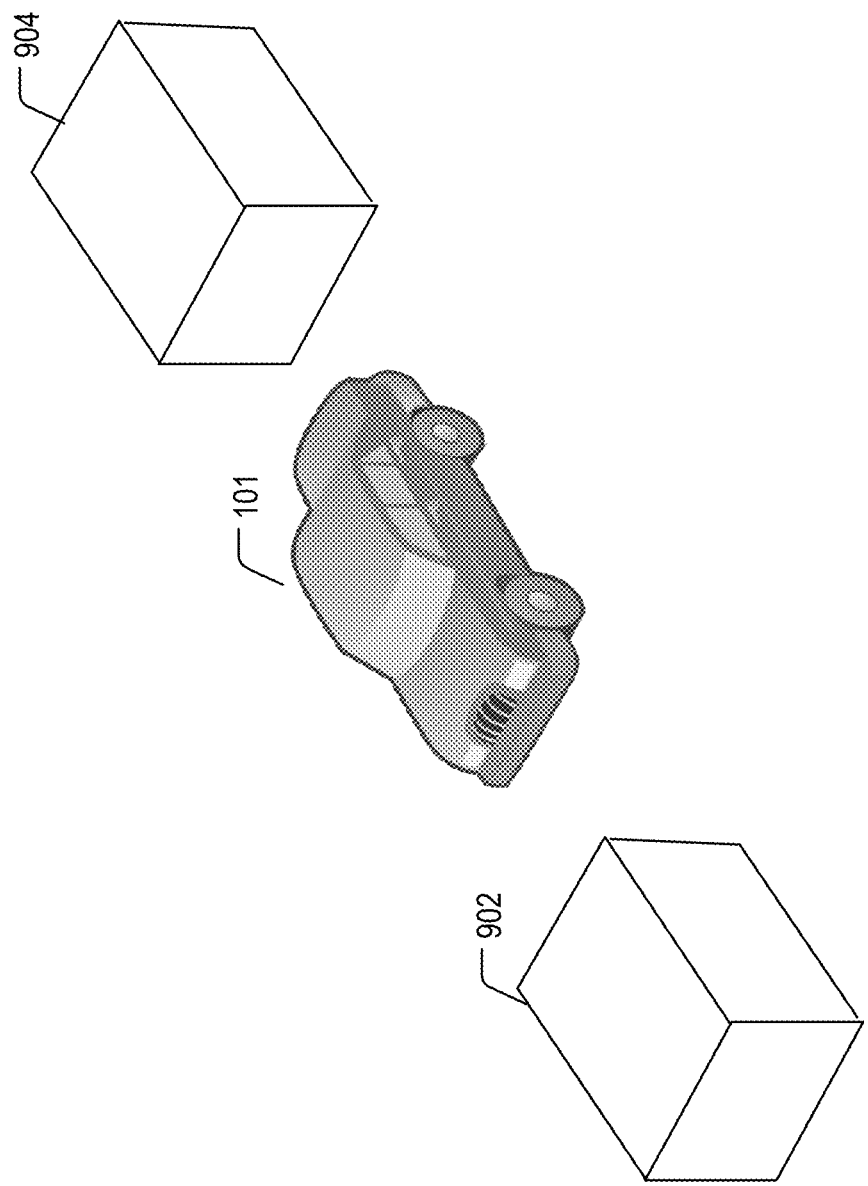
FIG. 9 illustrates example sampling regions for detecting raindrops.

Rainy conditions are usually associated with excessive water splashes around the vehicle. Further, windshield washer liquid spray from the vehicle may also cause splashes. In order to reduce miscount due to these splashes, counting of raindrops may be performed only in zones that are not overly affected by these splashes. In some example implementations shown in FIG. 9, volumetric sampling zones may be predetermined. Each of these volumetric sampling zones may be associated with a range of vertical and azimuthal angles of probing laser pulses and a range of object distances. For example, as shown in FIG. 9, two volumetric sampling zones 902 and 904 in the front and back of the vehicle 101 may be predetermined as the raindrop detection or sampling zones. These sampling zones, for example, may be a minimum distance away from the vehicle and outside of the water and windshield washing liquid splash zones. The volumes and locations of the sampling zones may be adjustable and reconfigurable. Merely as an example, each of the predefined sampling zones 902 and 904 may be of 6×4×3 m³. In a vehicle coordinate system, such a sampling zone may be 6 meters in front of or behind the vehicle, 4 meters in width (to avoid enclosing any dangling object on the left and right side of the vehicle), and between 0.5 and 3.5 meters above the ground (to avoid objects from the road and objects over the road, such as tree branches).

Figure 10B:
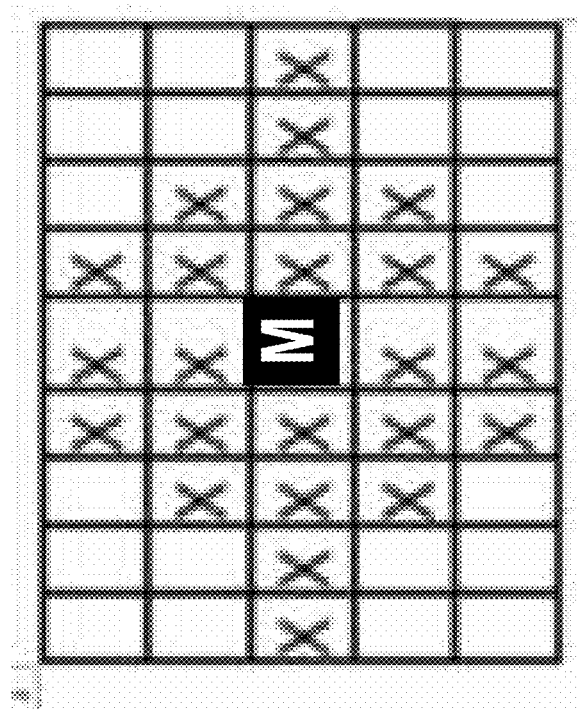
FIG. 10b illustrates a projection of the points in the sampling box of FIG. 10a onto a 2D plane to generate a 2D point matrix.
Figure 10A:
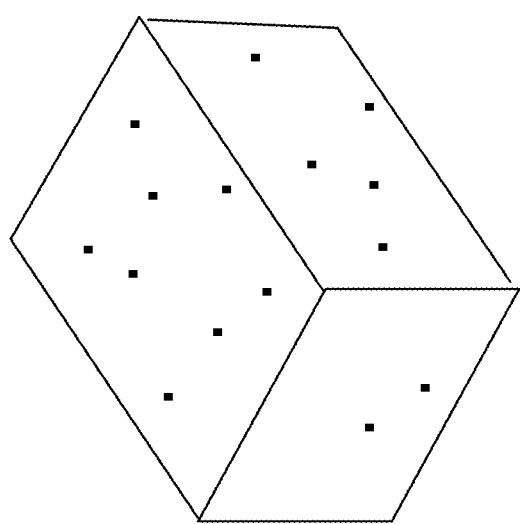
FIG. 10a illustrates a point cloud in a sampling region representing raindrops.

Each raindrop comprises an individual object in the air that can be detected by the LIDAR device. Each detected raindrop, for example, may be associated with one or more neighboring points within the point cloud detected by the LIDAR device in the raindrop zones. Each of these one or more points is associated with a direction (e.g., vertical and azimuthal angles of the probing laser pulse) and a measured distance. Example detected raindrops within a raindrop zone is shown in FIG. 10a. Each point shown in FIG. 10a represents a raindrop. Each raindrop may correspond to one or more points of the detected point cloud of the LIDAR device.

In some example implementations, identifying and counting of the raindrops may be performed by projecting the point cloud in the 3D volume of each raindrop zone in FIG. 10a to a 2D matrix. Example portion of the 2D matrix showing detected points in the point cloud associated with one raindrop is shown in FIG. 10b. A detected point in the 2D matrix of FIG. 10b (such as the point marked as "M" at <x, y> positions in the 2D matrix) may be considered as a raindrop if it has few or no detected points at neighboring positions (the neighboring positions of M are marked as "x" in FIG. 10b, with the immediate neighboring positions at <x+1, y>, <x-1, y>, <x, y+1>, and <x, y-1> in the 2D matrix). For example, a threshold of 0, 1, or 2 neighboring points may be used for determining whether a point detected in the raindrop zone, such as point M, is associated with a raindrop. Raindrops within the sampling zone as determined in such a manner may be further counted as an indicator of a rain level.

LIDAR Operation and Performance Evaluation

The various indicators obtained from the various LIDAR measurements above individually or collectively describe the operation and performance condition of the LIDAR device. For example, the front and back dirtiness levels, the noise level, and the level of accumulation of objects that block the probing laser pulses at some directions all indicate degradation and/or compromise of the performance of the LIDAR device in one or more aspects. For another example, the rain level may affect how the other indicators above should be modified, considered, and incorporated in evaluating how they individually or collectively indicate a performance degradation and/or compromise of the LIDAR device.

These various indicators may be evaluated in real-time and iteratively to generate one or more system reactions. These system reactions may include but are not limited to service warnings/alerts and intervention to the operation of the vehicle (e.g., changing speed limit, slowing down, pulling over). These system reactions may be based on one or more of the individual indicators above or based on collective evaluations of these indicators.

Figure 11:
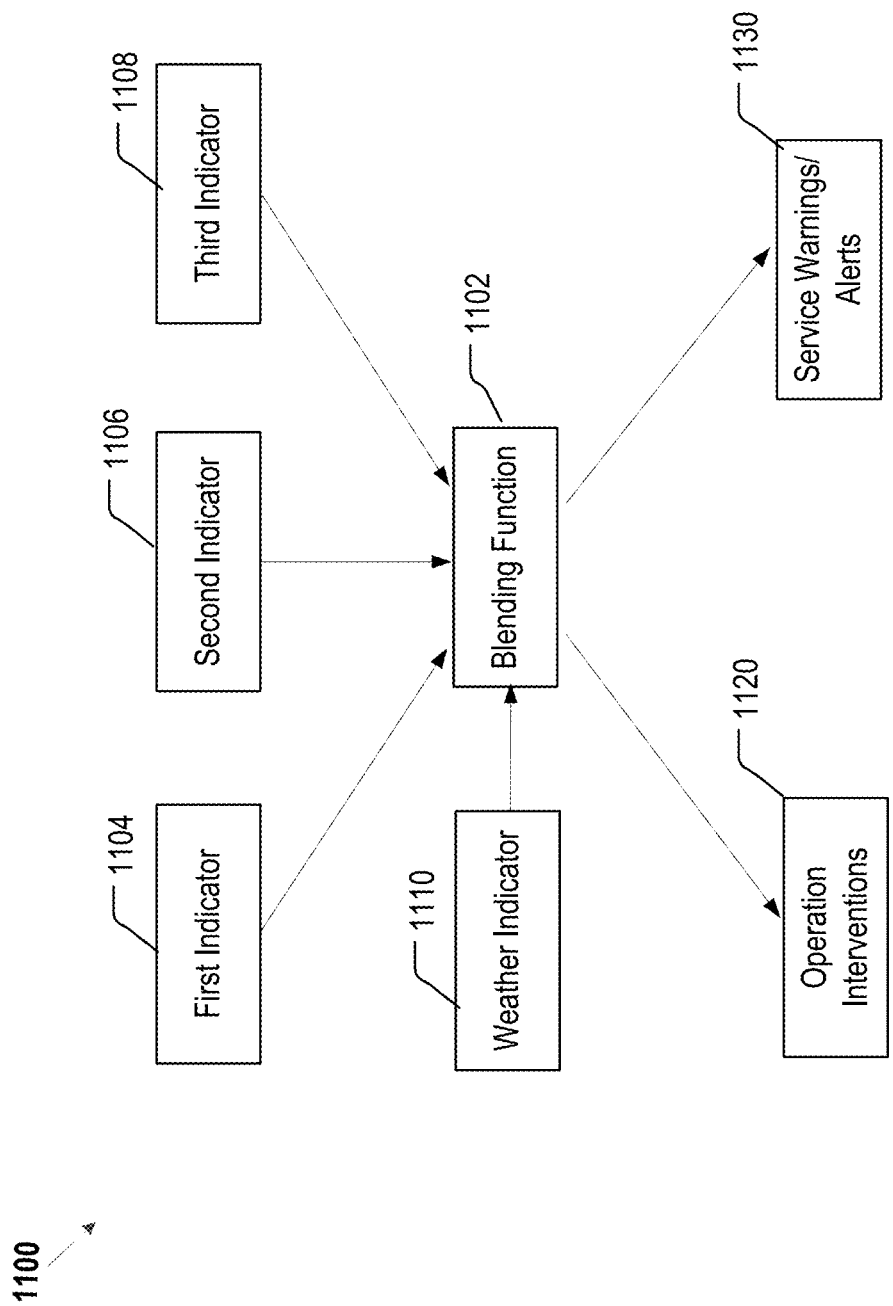
FIG. 11 shows an example bock diagram for blending various performance indicators of a LIDAR device to generate operation interventions and/or service warnings/alerts.

As such, this disclosure further provides a circuitry to perform the data analysis as shown in the block diagram 1100 in FIG. 11. Specifically, FIG. 11 shows that a blending data analytics function 1102 may be used to analyze a plurality of performance indicators, such as a first indicator 1104, a second indicator 1106, and a third indicator 1108, and further in consideration of weather indicator 1110, to generate one or more operation interventions 1120 and/or one or more service warnings/alerts 1130. As described above, the first indicator, the second indicator, and the third indicator, for example, may include the dirtiness level indicator, the non-return event level indicator, and the noise level indicator as measured from the LIDAR device, respectively. The weather indicator, for example, may include a rain level derived from the LIDAR measurements by counting raindrops as described above.

Various algorithms may be used in the blending function 1102. The blending function may derive the operation interventions 1120 and the service warning/alert 1130 based on the various indicators in any manner. The operation interventions 1120 may include but are not limited to stop, pull-over, slow down, and speed limit modification and enforcement. The warning/alert 1130 may include system messages requesting immediate service, service with minimum delay and messages requesting stop, pull-over, slow down, and the like. The particular logic flow below are described below merely as an example.

In the example below, the blending function 1102 may iteratively performing the following steps.

At power on of the vehicle, the blending function 1102 may first determining whether the noise level is greater than a minimum operation threshold noise level. If the noise level is larger than the threshold level, a service warning may be generated requesting immediate service. Further, the vehicle may be disabled from autonomous driving mode in the case that the noise level is excessive. This step may be performed as part of a daily routine check procedure. It may be configured to be performed indoors. It may be performed when there is no objects within the minimum detectable range of the LIDAR device.

When the vehicle is in operation, the blending function 1102 may be executed as an iterating first level monitoring loop. The first level monitoring loop may iterate every time period of a predefined time length. For example, the first level monitoring loop may iterate every 1 minute. In each of the iterating first level monitoring loop, the rain level may be first determined. If the blending function 1102 determines that it is currently raining, it sets the operation mode of the vehicle in a rainy mode during the current first level monitoring loop. Otherwise, it sets the operation mode of the vehicle in a sunny mode. Other parameters used in the blending function 1102 in the next steps in each first level monitoring loop may be automatically selected based on the rain level. Within each of the first level monitoring loop, on a finer time scale, e.g., every 0.1 second, a second level monitoring loop is performed by the blending function 1102 based on the selected parameters and the real-time first, second, and third performance indicators 1103, 1106, and 1108 to obtain a performance degradation level of the LIDAR device.

The degradation level may be obtained as a weighted blending of the various performance indicators. For example, the performance degradation level may be calculated as:

$$\text{degradation level} = \sqrt{c1*\text{Indicator}_1^2 + c2*\text{Inicator}_2^2 + c3*\text{Inicator}_3^2}$$

The parameters above (c1, c2, and c3), may be selected based on whether the vehicle is operated in rainy or sunny mode and the detected rain level in the first level monitoring loop. The calculated performance degradation level may be recorded as a function of time (for example, every 0.1 second).

As the degradation level of the LIDAR device is being recorded, they may be accumulatively and periodically analyzed, for example, every 30 seconds to generate one or more operation interventions 1120 and/or one or more service warnings/alerts 1130. For example, the blending function 1102 may determine whether the overall performance degradation level above is greater than a critical degradation level. An alert may be generated to indicate that the LIDAR device is in critical condition and the alert may be communicated to all module of the vehicle control system, when the overall degradation level is greater than the critical degradation level. Further, a pull-over and stop intervention may be initiated and a warning message requesting immediate service may be generated. If the overall degradation level above is lower than the critical degradation level but higher than a maintenance threshold level, the blending function 1102 may generate a warning message requesting timely service but may still allow a continued operation of the LIDAR device and the vehicle. Further, other intervention may be generated. For example, the control system of the vehicle may be instructed to slow down. For another example, a currently applicable speed limit may be adjusted based on the overall degradation level.

While the example above provided an intervention and warning scheme based on two different levels of overall degradation. Other schemes having more than two intervention and warning levels may be employed with corresponding threshold levels for the performance degradation. Further, the manner in which the performance degradation level is calculated above is shown merely as one of many examples. Other manners in which the various indicators are blended into the performance degradation level are within the scope of the disclosure above. Furthermore, multiple different degradation parameters may be constructed and independently calculated by the blending function 1102. Each of these degradation parameters may be a different mix of the various indicators above. These degradation parameters may be individually or collectively used to generate the one or more operation interventions 1120 and/or the one or more service warnings/alerts 1130.

Coding of LIDAR Detection Output

The output of the LIDAR include a distance value and direction of the probing laser pulse for each detection event. In some implementations, a distance value may be used either to represent a detected distance or to indicate a type of the detection output. The types of the detection output, for example, may include but are not limited to valid detection, invalid detection, no-return detection, as described above, and other types.

Specifically, only distance values equal to or larger than the minimum detectable distance are used to represented real measurement of distances. Values smaller than the minimum detectable distance may be used to code other information, such as the type of the detection output. For example, if the minimum detectable distance of the LIDAR device is 75 cm, then distances values at 75 cm or lager may be used to represent real detected distance values associated with the corresponding detection event. The LIDAR device may output a distance value smaller than 75 cm for a detection event to indicate that a distance was not measurable. Further, different values smaller than 75 cm may be used to code the type information and other system information. $A_n$ example coding scheme using the distance value in the output of the LIDAR device is shown below:

0: Intentional blank (LIDAR detector does not try to measure or no laser assigned).

1: Early saturation or invalid detection (Referring description above about detection of objects within minimum detectable distance and referring to Rx 302 and Rx_Ready 306 signal in FIG. 4, when echo pulse 414 is merged with the optical leakage 412 in the Rx return signal 404 before Rx_Ready 306 is asserted at 320. In other words, the detector is saturated by the optical leakage when the echo pulse arrives).

2: Hardware error (internal error detected on analog or digital circuit of the LIDAR device).

3: Software error (when there is an uncertainty in determining leading edge or trailing edge of the echo pulse, leading to abortion of the distance calculation logic).

4-74: Reserved for other system information.

75-20000: Valid data with measured distance.

The output from the LIDAR device may be transmitted to various hardware and software modules in the vehicle system. The information coded in the output, being either real distances, or other detection event type information or system information, may be used by the various modules to perform the degradation calculation above and any other calculations, decisions, and analytics.

The description and accompanying drawings above provide specific example embodiments and implementations. Drawings containing device structure and composition, for example, are not necessarily drawn to scale unless specifically indicated. Subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method automatically performed by a Light Detection And Ranging (LIDAR) device, comprising:
    transmitting laser pulses each at one of a set of directions for performing echo detections thereof;
    associating each of the set of directions with at least three detection outcome categories according to the echo detections, a first outcome category indicating a detection of echo with a valid distance, a second outcome category indicating a detection of echo with unresolvable distance, and a third outcome category indicating that no echo is detected;
    generating a plurality of system degradation indicators of the LIDAR device according to the echo detections and the at least three detection outcome categories;
    determining an environmental condition of the LIDAR device based on the echo detections;
    selecting a plurality of degradation thresholds according to the environmental condition; and
    generating a system instruction among a predetermined set of instructions for the LIDAR device based on the plurality of system degradation indicators and the plurality of degradation thresholds.

2. The method of claim 1, further comprising:
    associating a first subset of directions of the set of directions with the first outcome category when echoes for laser pulses associated with the first subset of directions are detected outside a minimum detection distance range of the LIDAR device; and
    determining a set of object distances each corresponding to one of the first subset of directions based on the echo detections.

3. The method of claim 2, further comprising associating a second subset of directions of the set of directions with the second outcome category when echoes for laser pulses associated with the second subset of directions are detected inside of the minimum detection distance range of the LIDAR device.

4. The method of claim 3, further comprising associating a third subset of directions of the set of directions with the third outcome category when echoes for laser pulses associated with the second subset of directions are undetected.

5. The method of claim 4, wherein the plurality of system degradation indicators comprise:
    a first degradation indicator indicative of a number of objects within the minimum detection distance range; and
    a second degradation indicator indicative of a number of laser pulses with no detectable echoes.

6. The method of claim 5, further comprising determining the first degradation indicator by identifying the number of objects within the minimum detection distance range of the LIDAR device based on analyzing the second subset of directions.

7. The method of claim 6, wherein identifying the number of objects within the minimum detection distance range of the LIDAR device comprises identifying continuous ranges of second subset of directions each being larger than a predetermined angular threshold size.

8. The method of claim 5, further comprising determining the second degradation indicator by:
    dividing the set of directions into two or more regions;
    separately counting numbers of the third subset of directions within the two or more regions; and
    determining the first degradation indicator based on a comparison between the numbers of the third subset of directions for the two or more regions.

9. The method of claim 8 wherein the LIDAR device is operatively configured to assist autonomous driving in a vehicle, and wherein the two or more regions comprises a front region and a rear region of the vehicle.

10. The method of claim 5, wherein the plurality of system degradation indicators further comprise a third degradation indicator indicative of an amount of detection noise within the first subset of directions.

11. The method of claim 10, wherein the third degradation indicator comprises accumulated variation of distances of a predetermined number of neighboring directions within the first subset of directions as measured from the echo detections.

12. The method of claim 10, wherein generating the system instruction among a predetermined set of instructions for the LIDAR device comprises:
    determining an overall degradation measure of the LIDAR device based on weighted combination of the first degradation indicator, the second degradation indicator, and the third degradation indicator; and generating the system instruction based on the overall degradation measure and the plurality of degradation thresholds.

13. The method of claim 2, wherein determining the environmental condition comprises determining a rainy condition.

14. The method of claim 13, wherein determining the rainy condition comprises identifying raindrops based on the echo detections associated with the first subset of directions.

15. The method of claim 14, wherein identifying raindrops comprises identifying directions among the first subset of directions within a predetermined range of directions and corresponding object distances within a predetermined object distance range that are spatially isolated more than a predetermined isolation threshold in direction and in object distance.

16. The method of claim 1, wherein the LIDAR device is operatively configured to assist autonomous driving in a vehicle, and wherein the predetermined set of instructions comprises alerts of different maintenance levels.

17. The method of claim 16, wherein the predetermined set of instructions comprise at least one of:
- slow down the vehicle;
- stop the vehicle;
- pull over the vehicle;
- go to service station immediately; or
- go to service station with minimal delay.

18. The method of claim 1, wherein the LIDAR device is operatively configured to assist autonomous driving in a vehicle, and wherein the system instruction comprises a speed limit.

19. A system for Light Detection And Ranging (LIDAR), comprising:
- a laser source;
- a detector; and
- a processing circuitry in communication with the laser source and the detector, wherein the laser source is configured to transmit laser pulses each at one of a set of directions for performing echo detections thereof;

and wherein the processing circuitry is configured to:
- associate each of the set of directions with at least three detection outcome categories according to the echo detections, a first outcome category indicating a detection of echo with a valid distance, a second outcome category indicating a detection of echo with unresolvable distance, and a third outcome category indicating that no echo is detected;
- generate a plurality of system degradation indicators according to the echo detections and the at least three detection outcome categories;
- determine an environmental condition of the system based on the echo detections;
- select a plurality of degradation thresholds according to the environmental condition; and
- generate a system instruction among a predetermined set of instructions based on the plurality of system degradation indicators and the plurality of degradation thresholds.

* * * * *